United States Patent [19]

Hamma et al.

[11] 4,192,199

[45] Mar. 11, 1980

[54] CONTROL SYSTEM FOR HYDROSTATIC TRANSMISSION

[75] Inventors: Karlmann Hamma; Anton Ott, both of Tettnang, Fed. Rep. of Germany

[73] Assignee: Zahnradfabrik Friedrichshafen AG, Friedrichshafen, Fed. Rep. of Germany

[21] Appl. No.: 850,387

[22] Filed: Nov. 10, 1977

[51] Int. Cl.² .................... F16H 47/04; F16D 31/02
[52] U.S. Cl. ........................................ 74/687; 60/431; 60/468
[58] Field of Search .................... 74/687, 720; 60/468, 60/487, 431, DIG. 2

[56] References Cited

U.S. PATENT DOCUMENTS

| 3,884,095 | 5/1975 | Miyao et al. | 74/687 |
| 3,903,756 | 9/1975 | Hamma | 74/687 |
| 4,102,425 | 7/1978 | Marsden et al. | 60/468 X |

FOREIGN PATENT DOCUMENTS

| 1750503 | 6/1972 | Fed. Rep. of Germany | 74/687 |
| 2307550 | 8/1974 | Fed. Rep. of Germany | 74/687 |

*Primary Examiner*—C. J. Husar
*Assistant Examiner*—Frank McKenzie
*Attorney, Agent, or Firm*—Karl F. Ross

[57] ABSTRACT

A hydrostatic transmission has an input connected to a prime mover and an output connected through a speed-change transmission to a load. A control element of this transmission is urged in a direction tending to increase the transmission ratio by a control cylinder pressurized from a hydraulic tachometer operated by the transmission input, and is urged in the opposite direction to decrease the ratio by a regulating cylinder connected via a feed line to the hydraulic network interconnecting the pump and motor of the transmission. During speed change the two cylinders are depressurized and the regulating cylinder is isolated from the network.

10 Claims, 1 Drawing Figure

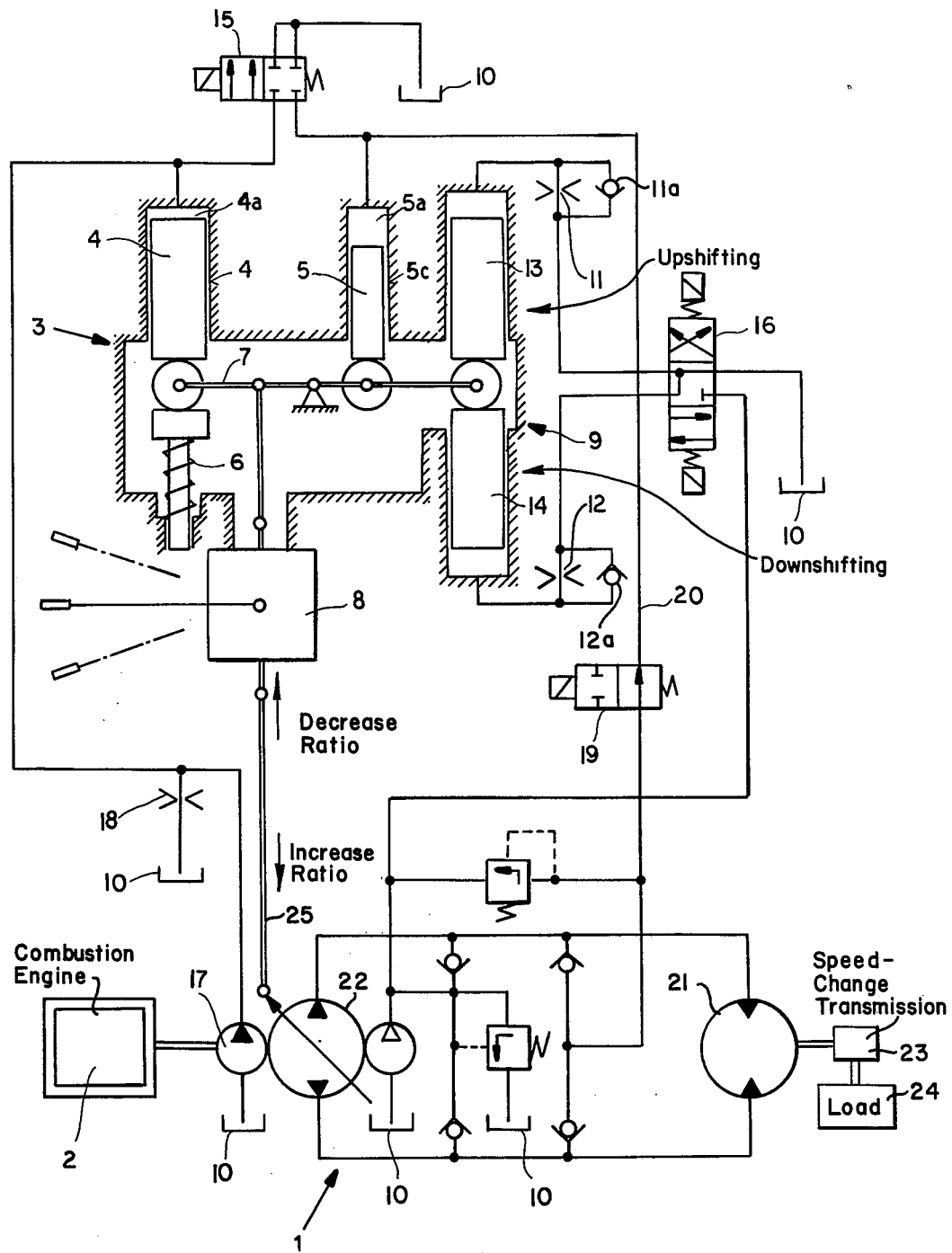

CONTROL SYSTEM FOR HYDROSTATIC TRANSMISSION

FIELD OF THE INVENTION

The invention relates to a positioning device for a power-controlled hydrostatic transmission having an output connected through a speed-change transmission to a load.

BACKGROUND OF THE INVENTION

The invention is based on a state of the art such as shown in German patent publication 2,307,550. In accordance therewith the shifting characteristics of a speed-change transmission connected to the output of a hydrostatic transmission are improved in that for correlation of the rotary speeds of the clutches to be engaged and disengaged in the speed-change transmission, the hydrostatic transmission at the beginning of a speed change is operated so that its output speed follows the rotary speed to be changed by a positive or negative increment. Thus the rotary speed differentials registered by the tachometers at the clutches to be engaged and disengaged are used to control a servovalve which itself operates the positioning apparatus.

In the power regulator of German patent publication 2,307,550 a particular positioning piston engages directly on the control rod of the power regulator and thereby also on the positioning rod extending from the regulator to the variableoutput hydraulic pump. This gives two disadvantages: First of all relatively large positioning forces are required by the heavy-duty and normally physically relatively large control element, and secondly during the speed-change operation pressure surges in the form of positive and negative pressure peaks occur which are effective over the operating pressure on the regulator and there produce pulses which interfere with the positioning. This therefore has a bad effect on the quality of the shifting operation.

OBJECT OF THE INVENTION

An object of this invention is to improve the positioning of the hydrostatic transmission for rotary-speed correlation during speed change and to avoid interfering pulses as a result of pressure peaks.

SUMMARY OF THE INVENTION

This object is obtained in that during the speed-change operation the chamber of the control system and the chamber of the reulating system are depressurized by a pilot valve and simultaneously the pressure line from the high-pressure circuit of the hydrostatic transmission to the chamber of the regulating system is blocked.

German patent publication 1,750,503 shows that it is known in a hydrostatic/mechanical transmission having speed-change clutches to isolate the power-regulating elements of the hydrostatic transmission during engagement or disengagement of the transmission clutches momentarily from the control pressure effective on the regulator, i.e. to make it ineffective, however with this shifting arrangement the influence on the high-pressure circuit is not taken into account. Thus the positioning apparatus falls for the short period of the speed change under the influence of the pressure variations transmitted to the hydrostatic high-pressure circuit as a result of the pressure surges during speed change, a result which should however be prevented according to the instant invention.

In accordance with the invention in a very simple way during the clutch engagement and disengagement phase the regulator is "unlocked" and then only controlled in accordance with or made to follow the clutch rotary-speed differential, while load variations resulting from the dynamic operation of the speed changes are not effective as pressure peaks on this correlation operation. In addition it has the advantage that the positioning device can be made substantially lighter and smaller as a result of a now slight positioning forces.

BRIEF DESCRIPTION OF THE DRAWINGS

An embodiment of the invention is shown schematically in the drawing.

SPECIFIC DESCRIPTION

The hydrostatic adjustable transmission 1 constituted by a hydrostatic motor 21 and a hydrostatic pump 22, with the pump 22 normally being of variable capacity, is driven by a combustion motor 2 or another prime mover and is connected through a speed-change transmission 23 to a load 24. The controlling and regulating device 3 serves to position and control the hydrostatic transmission.

The control piston 4 is pressed by a variable control pressure against the spring 6 to effect a positioning of the control elements 25 in the control and regulating device and thereby also a stroke change, i.e. transmission-ratio change in the hydrostatic transmission.

In the illustrated example a rotary-speed dependent control pressure is employed which is obtained by a rotary-speed dependent constant-displacement pump 17 in conjunction with a fixed restriction 18.

An output pressure proportional to the load is effective in the opposite direction through a line 20 on the regulating piston 5 in the control and regulating device 3. The control piston 4 and regulating piston 5 engage the positioning lever 7 of the control and regulating device 3 and set the hydrostatic transmission 1 by means of the reversing mechanism 8. In order that the hydrostatic transmission 1 can move freely during the speed-change operation and in order to eliminate the effects of the control pressures and load changes, the chambers 4a and 5a can be depressurized by means of the valve 15 and connected to the hydraulic sump 10.

Since the output pressure during the speed-change operation should not drop off and since the complete load should be transmitted through the clutch to be engaged or disengaged, the line 20 to regulating-piston chamber 5a is simultaneously blocked by means of a valve 19. The speed correlation of the hydrostatic transmission is effected by means of the positioning device 9. During upshifting the piston 13 is acted on, thereby swinging back the hydrostatic transmission, and during downshifting the piston 14 is acted on, thereby swinging out the hydrostatic transmission.

The positioning time is damped by means of the two restrictions 11 and 12. Only that restriction is effective which is connected to the hydraulic feed line through its respective check valve 11a or 12a so that it is not damped. The speed correlation of the hydrostatic transmission is controlled by the multiport valve 16 which in turn is operated by a nonillustrated known tachometer (German patent publication 2,307,550).

We claim:

1. A control system for regulating a hydrostatic transmission having an input hydraulic machine constituted as a pump having an input drivable at an input speed by a prime mover, an output hydraulic machine constituted as a motor having an output displaceable at an output speed and connectable through a speed-change transmission to a load, and a pressurizable hydraulic network interconnecting said machines and transferring force therebetween, one of said machines having a control element displaceable to vary the input-speed/output-speed transmission ratio, a said system comprising:

means including a pressurizable control cylinder for exerting on said control element in one direction a force related to said input speed;

means including a pressurizable regulating cylinder connected to said network for exerting on said control element in the opposite direction a force related to load; and valve means connected to said cylinders for isolating said regulating cylinder from said network and depressurizing both of said cylinders during speed change of said transmission.

2. The system defined in claim 1, further comprising biasing means for exerting a substantially constant biasing force on said element in said opposite direction.

3. The system defined in claim 1 wherein said regulating cylinder has a feed line directly connected to said network, said valve means including a blocking valve in said line.

4. The system defined in claim 1, further comprising a constant-displacement pump connected directly to said input and having an output line, and a fixed restriction between said output line and a sump, said valve means including a valve between said output line and said control cylinder.

5. The system defined in claim 1, further comprising power-assist means effective during upshifting at said speed-change transmission for urging said control element in said opposite direction and effective during downshifting at said speed-change transmission for urging said control element in said one direction.

6. The system defined in claim 1, further comprising:

means connectable to said transmission for urging said control element in said one direction during downshifting of said transmission; and means connectable to said transmission for urging said control element in said opposite direction during upshifting of said transmission.

7. The system defined in claim 6 wherein said means connectable to said transmission each include a hydraulic cylinder engaging said control element.

8. The system defined in claim 7, further comprising two restrictions and means for connecting each of said hydraulic cylinders to a sump through a respective restriction during operation of the other hydraulic cylinder to urge said element in the respective direction.

9. A method of operating a hydrostatic transmission having an input hydraulic machine constituted as a pump and having an input drivable at an input speed by a prime mover, an output hydraulic machine constituted as a motor, and having an output connectable through a speed-change transmission to a load, and a control element on one of said machines displaceable in one direction to increase the input/output transmission ratio and displaceable in the opposite direction to decrease said ratio, said method comprising the steps of:

exerting on said control element in said one direction a force related to the input speed of said transmission;

exerting on said control element in said opposite direction a force related to the loading of said output; and relieving said element of both of said forces during speed change of said transmission.

10. The method defined in claim 9 wherein said transmission includes a hydraulic network interconnecting said machines and at an operating pressure proportional to said loading of said output, said forces being exerted by pressurizing a control cylinder with a pressure proportional to said input speed and engaging said cylinder against said control element and by pressurizing a regulating cylinder directly from said network, said method further comprising the step of isolating said regulating cylinder from said network during speed change of said transmission.

* * * * *